(12) United States Patent
Hutton et al.

(10) Patent No.: US 9,471,388 B2
(45) Date of Patent: Oct. 18, 2016

(54) MAPPING NETWORK APPLICATIONS TO A HYBRID PROGRAMMABLE MANY-CORE DEVICE

(71) Applicant: Altera Corporation, San Jose, CA (US)

(72) Inventors: Michael D. Hutton, Palo Alto, CA (US); Anargyros Krikelis, Farnham (GB)

(73) Assignee: Altera Corporation, San Jose, CA (US)

( * ) Notice: Subject to any disclaimer, the term of this patent is extended or adjusted under 35 U.S.C. 154(b) by 663 days.

(21) Appl. No.: 13/826,039

(22) Filed: Mar. 14, 2013

(65) Prior Publication Data

US 2014/0282560 A1    Sep. 18, 2014

(51) Int. Cl.
*H04L 12/28* (2006.01)
*G06F 9/50* (2006.01)

(52) U.S. Cl.
CPC .......... *G06F 9/5055* (2013.01); *G06F 9/505* (2013.01); *G06F 9/5033* (2013.01); *G06F 9/5044* (2013.01)

(58) Field of Classification Search
CPC ....... H04L 45/00; G06F 13/42; G06F 9/4881
USPC .......................................................... 370/389
See application file for complete search history.

(56) References Cited

U.S. PATENT DOCUMENTS

| | | | |
|---|---|---|---|
| 6,836,808 B2* | 12/2004 | Bunce | H04L 49/1546 709/232 |
| 7,461,236 B1 | 12/2008 | Wentzlaff | |
| 7,746,862 B1 | 6/2010 | Zuk et al. | |
| 8,761,188 B1* | 6/2014 | Krikelis | G06F 15/7896 370/412 |
| 2002/0064154 A1 | 5/2002 | Sharma et al. | |
| 2002/0097679 A1 | 7/2002 | Berenbaum | |
| 2003/0172249 A1 | 9/2003 | Ganapathy et al. | |
| 2004/0049613 A1 | 3/2004 | Kim et al. | |
| 2004/0158573 A1 | 8/2004 | Bradley et al. | |
| 2004/0264467 A1* | 12/2004 | Foglar | H04L 12/4633 370/392 |
| 2005/0249185 A1 | 11/2005 | Poor et al. | |
| 2006/0168283 A1* | 7/2006 | Georgiou | G06F 9/5027 709/230 |
| 2006/0179156 A1 | 8/2006 | Etherton et al. | |
| 2007/0053356 A1 | 3/2007 | Konda | |
| 2007/0253411 A1* | 11/2007 | Arad | H04L 47/10 370/389 |
| 2013/0343379 A1* | 12/2013 | Stroud | H04L 43/06 370/389 |

OTHER PUBLICATIONS

Hauser et al., "Garp: A MIPS Processor with a Reconfigurable Coprocessor" University of California, Berkeley, pp. 24-33 (Apr. 1997).

* cited by examiner

*Primary Examiner* — Christopher R Crompton
(74) *Attorney, Agent, or Firm* — Fletcher Yoder, P.C.

(57) ABSTRACT

A hybrid programmable logic is described that performs packet processing functions on received data packets using programmable logic elements, and processors interleaved with the programmable logic elements. The header data may be scheduled for distribution to processing threads associated with the processors by the programmable logic elements. The processors may perform packet processing functions on the header data using both the processing threads and hardware acceleration functions provided by the programmable logic elements.

18 Claims, 8 Drawing Sheets

MAPPING NETWORK APPLICATIONS TO A HYBRID PROGRAMMABLE MANY-CORE DEVICE

BACKGROUND OF THE INVENTION

The present invention relates to a mapping of a packet processing function onto a hybrid programmable logic device containing many programmable processors, dedicated function blocks, and programmable FPGA fabric.

A packet processor may accept ingress packets from a physical interface, perform classification and filtering operations on the packet, and then forward the packet to a traffic manager. The traffic manager interfaces with a switch fabric to switch packets onto egress packet processors and physical interfaces. Although there is no well-defined "packet processing" function, packet processing may include, but is not limited to, MAC capture and framing of packets, packet parsing, classification of packets into flows, maintenance of routing statistics and counters, IP translation, IP table lookup, or packet encapsulation and decapsulation. End applications of a packet processor may target one or more of the OSI transport layer, network layer, or application layer of the protocol stack.

SUMMARY OF THE INVENTION

The present invention provides a hybrid programmable logic device which includes a programmable field programmable gate array logic fabric (e.g., programmable logic elements) and a many-core distributed processing subsystem (e.g., many-core processors). It is noted that the term "hybrid" refers to a device which integrates both a fabric of programmable logic elements and processors in the same device, i.e., the same chip. In the provided architecture, the programmable logic elements may provide hardware acceleration functions that are "late binding," meaning that the specific functionality and logic architecture used to form a hardware acceleration function can be defined after the device is fabricated. For example, the programmable logic elements may be partitioned or grouped into hardware accelerators via software that programs the hybrid programmable logic device at runtime. It is also noted that the term "device" refers to any embodiment or combination or embodiments of a hybrid programmable logic device described herein.

The present invention processes data packets that contain control data, header data, and payload data. It is noted that "header data" refers to administrative information associated with a packet, such as information about the source and destination of the packet, data encryption of the packet, or any other information that is separate from the message of the packet itself. In addition, it is noted that "payload data" refers to the actual data that confers the message of the packet. Further, it is noted that "control data" refers to a subset of payload data that includes information necessary to instruct or reprogram the functions of the hybrid reprogrammable logic device.

In certain embodiments, the hybrid programmable logic device may receive data packets that include header data and payload data. The device may include programmable logic elements, and processors tiled among the programmable logic elements. It is noted that the term "tiled" refers to arranging the processors such that they are interleaved or interspersed among programmable logic elements. For example, the processors may be arranged consecutively in a two dimensional plane with the programmable logic elements such that there are no other programmable logic elements between consecutive processors. The header data may be scheduled for distribution to processing threads associated with the processors by the programmable logic elements. The processors may perform packet processing functions on the header data using both the processing threads and hardware acceleration functions provided by the programmable logic elements.

In certain embodiments, the data packets may be received at one speed, while the processors may operate at a different speed. Scheduling circuitry may transmit header data between the input of the device and processors at a rate asynchronous with respect to the clock speed.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION

Figure 1:
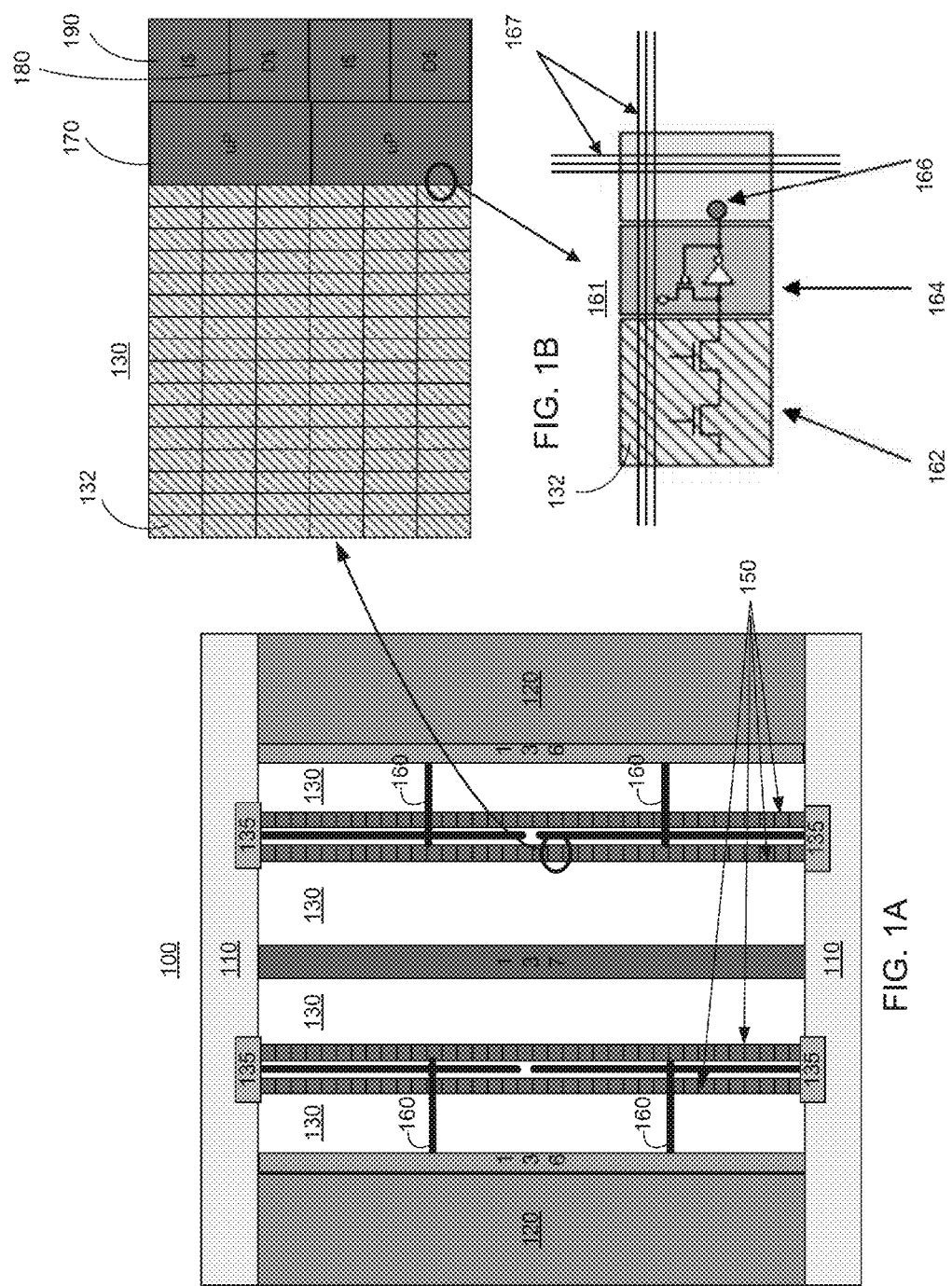
FIG. 1A is a hybrid programmable logic device with a hardened data bus and ingress/egress in accordance with an embodiment of the present invention.
FIG. 1B is an expanded view of the hybrid programmable logic device containing processors adjacent to programmable logic elements in accordance with an embodiment of the present invention.
FIG. 1C is an expanded view of the hybrid programmable logic device containing an interface between the processors and programmable logic elements in accordance with an embodiment of the present invention.

Packet processing functions are typically implemented in dedicated hardware, such as ASIC function blocks. However, packet processing functions must be programmed with flexibility, as networking protocols constantly change. It would therefore be desirable to implement packet processing on a device that allows for ease of reconfiguration with the speed of a dedicated processor.

FIG. 1A is a hybrid programmable logic device 100 in accordance with an embodiment of the present invention. Device 100 includes regions of programmable logic elements 130, and processors 150. General purpose input/output circuitry 110 can include one or more generic pins that can be controlled or programmed by external software at runtime. In certain embodiments, general purpose input/output circuitry 110 can be configured to input or output data, can read or write data, can be used as IRQs for wakeup events, or can be used to transfer data from sources peripheral to device 100. High-speed serial interface 120 can facilitate the transfer of information between external sources of data (not shown), programmable logic elements 130, and processors 150 using high-speed transceiver blocks. For example, high-speed serial interface 120 may interface with an Ethernet connection to receive packets of information, process these packets with programmable logic elements 130 and processors 150, and switch the packets to different physical interfaces. In certain embodiments, high-speed serial interface 120 may transfer data at much higher speeds than general purpose input/output circuitry 110. For example, high-speed serial interface 120 may read and write data at a rate of tens of Gigabits per second, while general purpose input/output circuitry 110 may write data at a rate hundreds of Megabits. In certain embodiments, high-speed serial interface 120 may operate at line-rate, meaning the aggregate throughput rate of device 100 (e.g., 100 Gigabits per second across multiple serial channels), while processors 150 and programmable logic elements 130 operate at a distributed rate, meaning that the aggregate throughput of processing threads (and corresponding memories and hardware acceleration blocks used during those processing threads) is no worse than the minimum throughput for the target application of device 100.

Programmable logic elements 130 can include any combination of logic gates and memory. In certain embodiments, these programmable logic elements may be grouped into logic array blocks ("LABs"), referring to a unit of programmable logic resources in devices provided by Altera Corporation, of San Jose, Calif. However, the invention is applicable to programmable logic elements from any source. In certain embodiments, the programmable logic elements may be grouped into hardware acceleration blocks. Each hardware acceleration block may be designated to perform a certain type of hardware event on received data. In certain embodiments, the hardware acceleration blocks may be configurable such that the event is tailored to that particular situation. For example, the hardware acceleration blocks can accept parameters that further define the hardware event to be performed on a received data packet. Parameters used to configure a hardware acceleration block may, for example, be generated by processors 150. Parameters can be transmitted to the hardware acceleration blocks through data bus 160, horizontal and vertical connectors 167 (described below with respect to FIG. 1C), or both. In certain embodiments, programmable logic elements 130 may include any suitable memory clusters, such as M20K memory clusters.

In certain embodiments, the hardware acceleration blocks are configured to perform dedicated packet processing functions. These functions may include error detection using cyclic redundancy checks or computing checksums, tag masking using multi-protocol label switching (MPLS) or VLAN tagging, IP lookup using external memory access, cryptography, data compression, or any other software-inefficient packet processing functions.

In certain embodiments, the programmable logic elements 130 may be configurable into different hardware acceleration blocks, after device 100 has been fabricated and deployed (e.g., during runtime of device 100 or through a remote update procedure). Thus, the hardware acceleration blocks made up of the programmable logic elements 130 may be late binding, which allows device 100 to be versatile in any number of applications in any number of domains. For example, device 100 may be updated to account for the latest error correction, video and image processing, or data management standards. This is different from commercial Network Processing Units, pipelined processors, and ASIC devices that have both processor and fixed hardware acceleration blocks, as these devices do not allow for the hardware accelerators to be defined after deployment.

In certain embodiments, programmable logic elements 130 may be substantially similar to the programmable logic elements of the Stratix® V FPGA sold by Altera Corporation of San Jose, Calif. However, it shall be understood that any programmable logic elements suitable for an FPGA or PLD may be used as programmable logic elements 130.

Processors 150 can include any suitable number of processors with many-core designs. These many-core designs may be based on microprocessor IP by vendors such as ARM, MIPS, Intel, or Tensilica. This microprocessor IP allows for the ability to create customized embedded processors (e.g., removing floating-point units), and customized instruction set architectures. In certain embodiments, the processors may be "hardened," meaning that they consist of fixed logic elements rather than programmable logic elements. This feature provides the integration of powerful many-core processors into a programmable logic fabric. In certain embodiments, the processors may be multi-threaded.

As depicted schematically in FIG. 1A, processors 150 are tiled in a four-column assembly structure in portions of the device 100 where programmable logic elements 130 are not present. In other embodiments, fewer or greater columns of processors may be used. In certain embodiments, the number of columns or processors, and the number of processors in each column may be more or less than depicted in FIG. 1A. The number of columns and number of processors 150 in each column may depend on the processor architecture for each processor. For example, more processors may be tiled on device 100 when the instruction cache and data cache of each processor is reduced. In one example, MIPS 34K multi-threaded processors with 16 KB of instruction cache and data cache are used. In this example, when shrunk to a design target of 28 nm, each processor consumes less than 0.25 square mm (millimeters) of silicon area on the device, which is equivalent to 30 Stratix® V LABs. It shall be understood that processors 150 may alternatively laid out in rows on device 100.

In certain embodiments, processors 150 are multi-threaded. Multi-threaded processors provide advantages to applications where it is commonly required to interface with an off-chip memory or lookup which could take multiple clock cycles of processing time, and thus increase latency, or to hide the latency of accelerator processing. For example, by blocking one thread in a processor to this lookup task, the processor is able to proceed with performing other functions. In certain embodiments, the multi-threading may be achieved by time-slicing operation on data received by the processors 150. In other embodiments, the multi-threading may be achieved by well-known operating system mechanisms.

The tiled layout of processors 150 on the device allows for efficient fabrication and provisioning of interconnect networks for communicating between the processors, programmable logic elements, and I/O interfaces of the device. This is because the programmable logic elements 130 and other elements of device 100 such as memory (not shown) are separate from processors 150. In addition, the tiled layout of processors 150 allows for the construction of processors 150 and programmable logic elements 130 in the same metal layers in device 100, as well the construction of an interconnect stack containing a data bus.

Device 100 also includes external memory 135 and embedded ternary-content addressable memory (TCAM) memory 137. Hardened data bus 160 may consist of dedicated circuit components that transfer data to and from processors 150, programmable logic elements 130, ingress/egress processing block 136, external memory 135, and embedded TCAM memory 137, rather than being reserved for other uses on the device. In certain embodiments, hardened data bus 160 may be referred to as a network on chip interconnect. In such embodiments, hardened data bus 160 may be dedicated to routing and/or carrying the data to and from the ingress/egress processing block to other elements of the device. Hardened data bus 160 can allow for high performance data transfer both internal and external to the device. In certain embodiments, hardened data bus 160 may include a portion of horizontal and vertical connectors 167 (FIG. 1C). In other embodiments, hardened data bus 160 may be entirely separate from horizontal and vertical connectors 167.

Hardened data bus 160 may have a variety of topologies. For example, hardened data bus 160 may have a ring topology, a shared bus protocol such as AXI designed by ARM holdings of Cambridge, United Kingdom, interconnect technology from Sonics, Arteris or other third party companies, or Avalon® interconnect designed by Altera Corporation of San Jose, Calif. In certain embodiments, hardened data bus 160 may be hierarchical. For example, hardened data bus 160 may be a 4-way division. In another example (not shown) hardened data bus 160 may be monolithic. In yet another example (not shown) hardened data bus may be segmented.

In certain embodiments (not shown), device 100 may not include hardened data bus 160. In such embodiments, signals may be routed between components of device 100 using programmable logic 100. Such embodiments are illustrated and discussed with respect to FIG. 1A of U.S. patent application Ser. No. 13/804,419, titled "Hybrid Programmable Many-Core Device with On-Chip Interconnect", filed concurrently herewith, which is incorporated by reference herein in its entirety.

In certain embodiments, portions of hardened data bus 160 may be connected or disconnected hierarchically by software that can program device 300. This software may include Quartus® software design by Altera Corporation of San Jose, Calif., or any other suitable software. In certain embodiments, the bandwidth of hardened data bus 160 is designed to achieve the line-rate of a particular application. For example, if hardened data bus 160 is 64 bits and operating at 1 GHz with 80% efficiency, it can provide 51 Gbps of bandwidth and be used to target a 50 Gbps streaming video application. In another example, if hardened data bus 160 is 64 bits and operating at 1.5 GHz with 80% efficiency, it can provide 150 Gbps of bandwidth and target an 100 Gb traffic switch application. In certain embodiments, separate hardened data buses may be added to carry data for processor input and output, as LAB input and output.

In certain embodiments, hardened data bus 160 may be placed over (e.g., in a metal layer above) or adjacent to processors 150 and programmable logic elements 130. In this manner, hardened data bus 160 is minimally invasive to the assembly of device 100.

External memory 135 may include any suitable interface to external memory, such as DDR memory. External memory 135 can buffer data in applications where device 300 is processing video data or packet data. In certain embodiments, embedded TCAM memory 137 may include any suitable block of content addressable memory, which is useful for networking applications. In certain embodiments, embedded TCAM memory 137 may interface with programmable logic elements 130 and processors 150 using circuitry substantially similar to interface circuitry 161 (FIG. 1C). In certain embodiments, TCAM memory 137 may be replaced by an SRAM or embedded SRAM packet buffer memory.

Ingress/egress processing block 136 can receive data and forward that data to other elements of device 300. For example, ingress/egress processing block 136 can receive data packets and provide protocol termination or packet framing services to device 300. In certain embodiments, ingress/egress processing block 136 may forward received data to hardened data bus 160. In certain embodiments, the ingress/egress processing block may consist of hardened ASIC blocks. These blocks may be structured according to the ASIC blocks disclosed in U.S. Pat. No. 8,314,636, which is incorporated by reference herein in its entirety. In certain embodiments, ingress/egress processing block may be built from programmable logic elements 130.

FIG. 1B is an expanded view of the hybrid programmable logic device 100 containing processors 150 adjacent to programmable logic elements 130 in accordance with an embodiment of the present invention. Two processors are depicted schematically in FIG. 1B as squares containing three components—processor core 170, instruction cache 180, and data cache 190. Also depicted schematically in FIG. 1B are programmable logic elements 130 that are grouped into LABs 132. In certain embodiments, the physical size of a dimension of the processors 150, such as length, height, or width, is a multiple of the same dimension of the programmable logic elements 150, or LABs made up of programmable logic elements 150. For example, as depicted in FIG. 1B, the width of each of the two processors is equal to three LABs 132. This allows for efficient assembly of devices having different dimensions, with differing ratios of processors to programmable logic elements or other logic blocks.

FIG. 1C is an expanded view of the hybrid programmable logic device 100 containing an interface 161 between the processors 150 and programmable logic elements 130 in accordance with an embodiment of the present invention. Interface 161 may be included between every LAB or row of LABs and processors 150. Interface 161 may include LIM/LEIM circuitry 162, interface logic 164, and interface port 166. LIM/LEIM circuitry 162 refers to collections of programmable input muxes "LAB Input Mux" and "Logic Element Input Mux," and may include any suitable number of LIM and LEIM multiplexors as commonly found in devices sold by Altera Corporation of San Jose, Calif. Interface logic 164 may include any suitable circuit components for buffering data to interface port 166. Interface port 166 may include any suitable circuitry for physically delivering signals to one of processors 150.

In certain embodiments, horizontal and vertical connectors 167 may also be included on device 100. Horizontal and vertical connectors 167 may transfer data between processors 150, programmable logic elements 120, general input/output interfaces, and memory on and off chip. In certain embodiments, horizontal and vertical connectors may be wired to interface circuitry 161 such that any signal from any of the programmable logic elements 130 can be delivered to interface port 166 via LIM/LEIM circuitry 162 and interface logic 164. For example, multiplexors within the LIM/LEIM circuitry 162 may choose which signal drives any global wire in the horizontal/vertical connectors 167 to connect any of the programmable logic elements 130 with processors 150.

Figure 2:
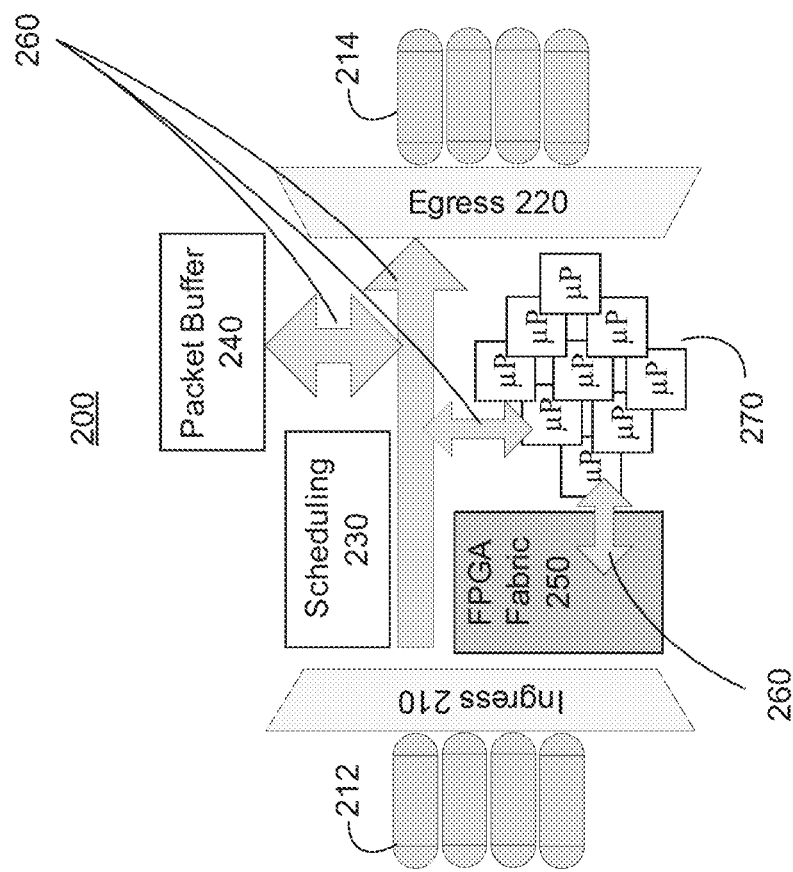
FIG. 2 is a diagrammatic mapping of a packet classification function onto a hybrid programmable logic device in accordance with an embodiment of the present invention.

FIG. 2 is a diagrammatic mapping of a packet classification function 200 onto a hybrid programmable logic device in accordance with an embodiment of the present invention. Packet classification function 200 includes high-speed transceivers 212 that receive data from external sources, such as incoming data pins of an Ethernet port, and transmit it to ingress block 210. Packet classification function 200 also includes high-speed transceivers 214 that transmit data from egress block 220 to external sources, such as outgoing data pins of an Ethernet port. In certain embodiments, data packets may be received by transceivers 212. These packets may contain control data, header data and payload data in any suitable packet frame format. Ingress block 210 may pre-process the received data packets by determining the format of the packet, such as identifying the framing and header of the packet. Ingress block 210 may also pre-process received data by determining the routing protocol associated with the received packets, such as TCP/IP. In certain embodiments, ingress block 210 may provide media-access control (MAC) layer functionality for packet classification function 200.

In certain embodiments, the functionality of ingress block 210 may be implemented by ingress/egress processing block 136 of device 100 (FIG. 1A). Ingress block 210 may be implemented using hardened ASIC blocks, or late-binding programmable logic (e.g., programmable logic elements of FPGA fabric 250). In embodiments where ingress block 210 is implemented in FPGA fabric 250, the MAC layer may be customized such that packet classification function 200 is suitable for a wide variety of applications. For example, the number of routing ports, channels, or both may be increased.

Once ingress processing block 210 pre-processes the received data, it is sent to one or more of scheduling block 230, packet buffer block 240, or processors 270 using data bus 260. Data bus 260 may be substantially similar to hardened data bus 160 (FIG. 1A). Scheduling block 230 may schedule processing of received data packets based on the resources of processors 270. In certain embodiments, scheduling block 230 may be implemented in programmable logic elements of FPGA fabric 250. In certain embodiments, scheduling block 230 may transmit the header data of received data packets to processors 270, and transmit the payload data of received data packets to packet buffer block 240. In embodiments where one or more of processors 270 are multi-threaded, scheduling block 230 may transmit the header data of received packets to available threads of processors 270.

Processors 270 may perform one or more packet processing tasks on the data using FPGA fabric 250. Such packet processing tasks may include one or more of MAC capture, packet framing, packet parsing, packet classification, maintenance of routing tables and routing statistics, maintenance of control packets, packet encryption and decryption, routing address translation, IP table lookup, packet segmentation and fragmentation, packet encapsulation and decapsulation, packet modification (i.e., packet duplication and tagging), packet quality-of-service maintenance (maintenance of access control lists, packet policing, and packet shaping), maintenance of industry standard buffering and latency requirements, and maintenance of any user-preferred packet processing modes. In certain embodiments, scheduling block 230 may send control signals to one or more of processors 270 using data bus 260 in order to coordinate the distribution of data to available processor threads. In such embodiments, control signals may also be sent to egress block 220 to coordinate the reordering of packets once their associated header data has been processed by processors 270.

Packet buffer block 240 may store payload data of received data packets in any suitable storage memory. In certain embodiments, the storage memory may be internal to the device that implements packet classification function 200, such as device 100 (FIG. 1A). For example, the storage memory may include local SRAM memory connected to data bus 260. This local memory could be on-die of processors 270, connected to processors 270 through a 2.5D Silicon interposer or true 3D connection, or connected to processors 270 through general-purpose or serial pins of the die.

Once processed, header data may be reassembled with corresponding payload data stored in packet buffer 270, and then routed to an external destination via egress block 220 and transceivers 214. In certain embodiments, egress block 220 may buffer and reorder packets based on the protocol associated with the format of the data packets received at ingress block 210 (e.g., TCP flow-ID). Egress block 220 may be implemented using hardened ASIC blocks, or late-binding programmable logic. In certain embodiments, egress block 220 may be implemented in programmable logic elements of FPGA fabric 250.

FPGA fabric 250 may contain any suitable number of programmable logic elements 130 (FIG. 1A). In certain embodiments, groups of programmable logic elements within FPGA fabric 250 may be configured into different hardware acceleration blocks. This configuration may occur after device 100 has been fabricated or deployed (e.g., during runtime of packet classification function 200). Thus, the packet classification capabilities of packet classification function 200 may be late binding, which allows for more versatile routing of data packets. For example, packet classification function 200 may be reconfigured after it is deployed with the latest routing protocols, error control, data encryption, IP lookup, IP address translation, or any other suitable packet processing functionality. This reconfiguration process is described with respect to FIG. 5 below.

Processors 270 may be substantially similar to processors 150 (FIG. 1A). Processors 270 may transmit packet data over data bus 260 to and from one or more hardware acceleration blocks in FPGA fabric 250. These hardware acceleration blocks may perform any routine or subroutine associated with the packet processing tasks discussed above with respect to processors 270. In certain embodiments, processors 270 and the hardware acceleration blocks in FPGA fabric 250 may access a hardware accelerator interconnect (not shown) that provides direct memory access (DMA). In addition, this hardware accelerator interconnect may provide access to an off-chip memory or lookup. In certain embodiments, the off-chip memory may include embedded TCAM memory 137 (FIG. 1A).

In certain embodiments, packet classification function 200 may operate in a "run-to-completion" mode. In this mode, resources of processors 270 and FPGA fabric 250 are either available or unavailable. When scheduling block 230 receives a packet, it is assigned to be processed in an available thread of one of processors 270. The assigned thread is then occupied for the life of the packet, i.e., until data associated with the packet is processed by processors 270 and FPGA fabric 250, and reassembled by egress block 220.

In certain embodiments, ingress block 210, egress block 220, and scheduling block 230 may operate at line-rate, meaning the aggregate throughput rate of the device implementing packet classification function 200 (e.g., device 100 (FIG. 1A)), while processors 270 may operate at a distributed rate, meaning the aggregate throughput of processing threads (and corresponding memories and hardware acceleration blocks of FPGA fabric 250 used with those processing threads) is no worse than the minimum throughput for the target routing application. In such embodiments, egress block 220 reorders packets from the same TCP flow so the order of outgoing packets is the same as incoming packets.

Figure 3:
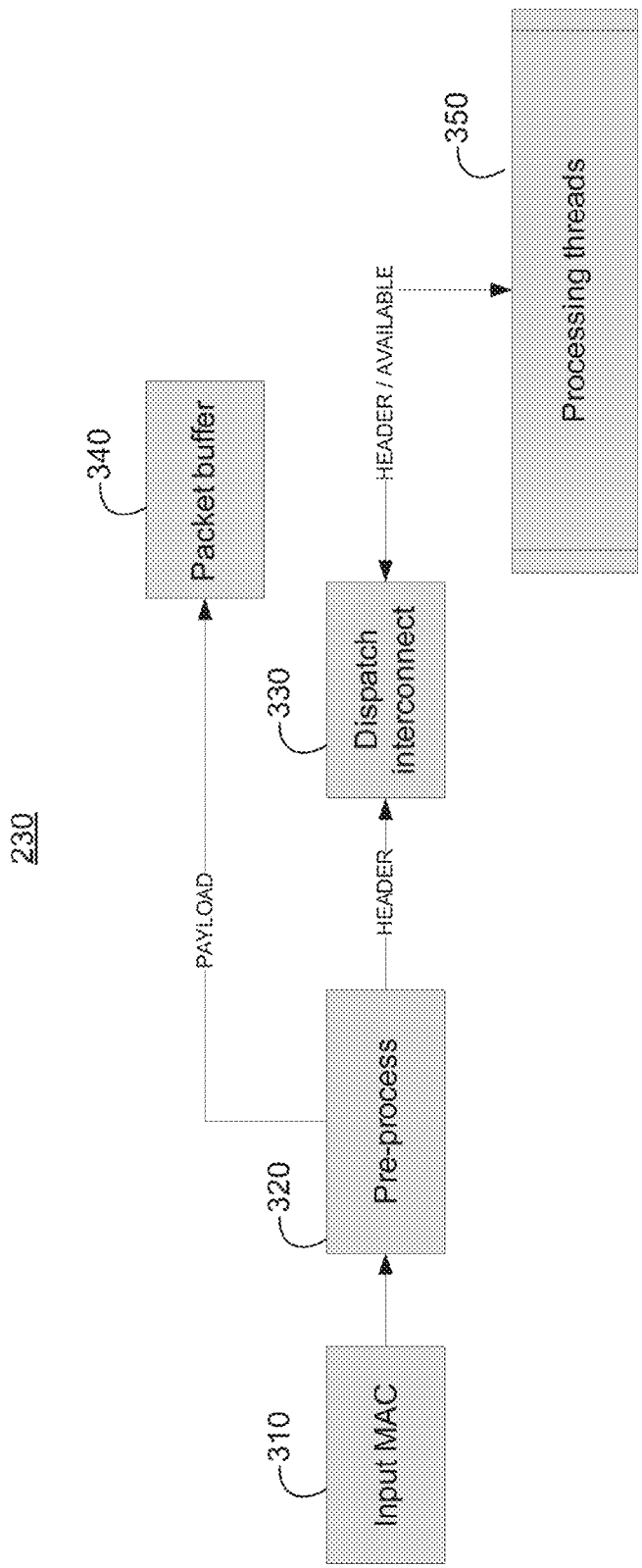
FIG. 3 is a more detailed view of a scheduling block of a packet classification function in accordance with an embodiment of the present invention.

FIG. 3 is a more detailed view of a scheduling block 230 of a packet classification function 200 (FIG. 2) in accordance with an embodiment of the present invention. Scheduling block 230 frames packet data and distributes it to an available thread of processors 270 (FIG. 2). In addition, scheduling block 230 manages the flow of packet data (i.e., performs packet flow control operations) when no threads are available among processors 270.

Scheduling block 230 receives packet data at input MAC 310. Input MAC 310 may be any suitable data stream from the media access control layer of packet classification function 200 (FIG. 2). In certain embodiments, input MAC 310 may receive data from ingress block 210. Input MAC 310 then forwards data to pre-process block 320. In certain embodiments, input MAC 310 may encrypt or decrypt received data. In other embodiments, encryption or decryption may be performed by processors 270. Pre-process block 320 frames the packet by determining the format of the information within the packet such as, for example, which portions of the packet contain payload data and which portions of the packet contain header data. Once a packet is framed, pre-process block 320 distributes header data to dispatch interconnect 330, and payload data to packet buffer 340. In certain embodiments, pre-process block 320 may communicate with dispatch interconnect 330 to check if there are any available threads among processors 270. If there are available threads, header data and payload data may be distributed as described above. If there are no available threads, pre-process block 320 may back-pressure input MAC 310, transmit packet payload data to packet buffer 340 for storage, or both. Alternatively, pre-process block 320 may drop the data associated with the packet.

In certain embodiments, pre-process block 320 may determine if a received packet is a control packet by comparing one or more of the header and payload of the packet to known control packet standards. In such embodiments, pre-process block 320 may intercept and route these control packets via dispatch interconnect 330 to one or more of processors 270 that are assigned to be housekeeper processors. These housekeeper processors may implement functions such as power and clock management. In certain embodiments, these housekeeper processors may be designated by the user of place and route tools. In other embodiments, housekeeper processors may be designated by the device that implements packet classification function 200 (e.g., device 100) during runtime. In other embodiments, the control packets may be processed by hardware subroutines resident in pre-process block 320. In such embodiments, pre-process block 320 may translate the control packet into instructions and routed to processing threads 350.

Packet buffer 340 may be substantially similar to packet buffer block 240. Packet buffer block 240 may store payload data until the packet associated with that payload data is ready for reassembly. In certain embodiments, a packet is reassembled when its associated header data has been processed by processor 270. In certain embodiments, packet buffer 340 may include memory internal to the device that implements packet classification function 200 (e.g., device 100). This memory may include that discussed with respect to packet buffer 240 (FIG. 2). In other embodiments, packet buffer 340 may include memory located off of the device that implements packet classification function.

Dispatch interconnect 330 receives packet header data from pre-process block 330, and distributes it to processing threads 350. In certain embodiments, dispatch interconnect 330 may be implemented using hardened data bus 160 (FIG. 1). In certain embodiments, dispatch interconnect 330 may determine whether there are any available processing threads 350 by pinging one or more of processors 270 periodically. Dispatch interconnect 330 may mark header data with a unique processor address or processing thread address. This address may be used by processors 270 to determine whether they should process particular header data that arrives on data bus 160, and what particular processing thread to use, or whether they should ignore particular header data. Processing threads 350 may include any processing thread of processors 270.

In certain embodiments, dispatch interconnect 330 may distribute header data associated with packets in the same TCP flow to related clusters of processors, such as those processors 270 that are designated to perform the same packet processing task (e.g., packet encryption and decryption, routing address translation, IP table lookup, etc.). In this manner, the load of the data buses used by dispatch interconnect 330 may be decreased, as well as the load of egress block 220 in reordering packets. In certain embodiments, schedule block 230 may be simplified to only contain dispatch interconnect 330. In such embodiments, dispatch interconnect 330 may receive header data and data associated with processing thread availability, and output header data along with the address of a particular processor or processing thread.

Figure 4:
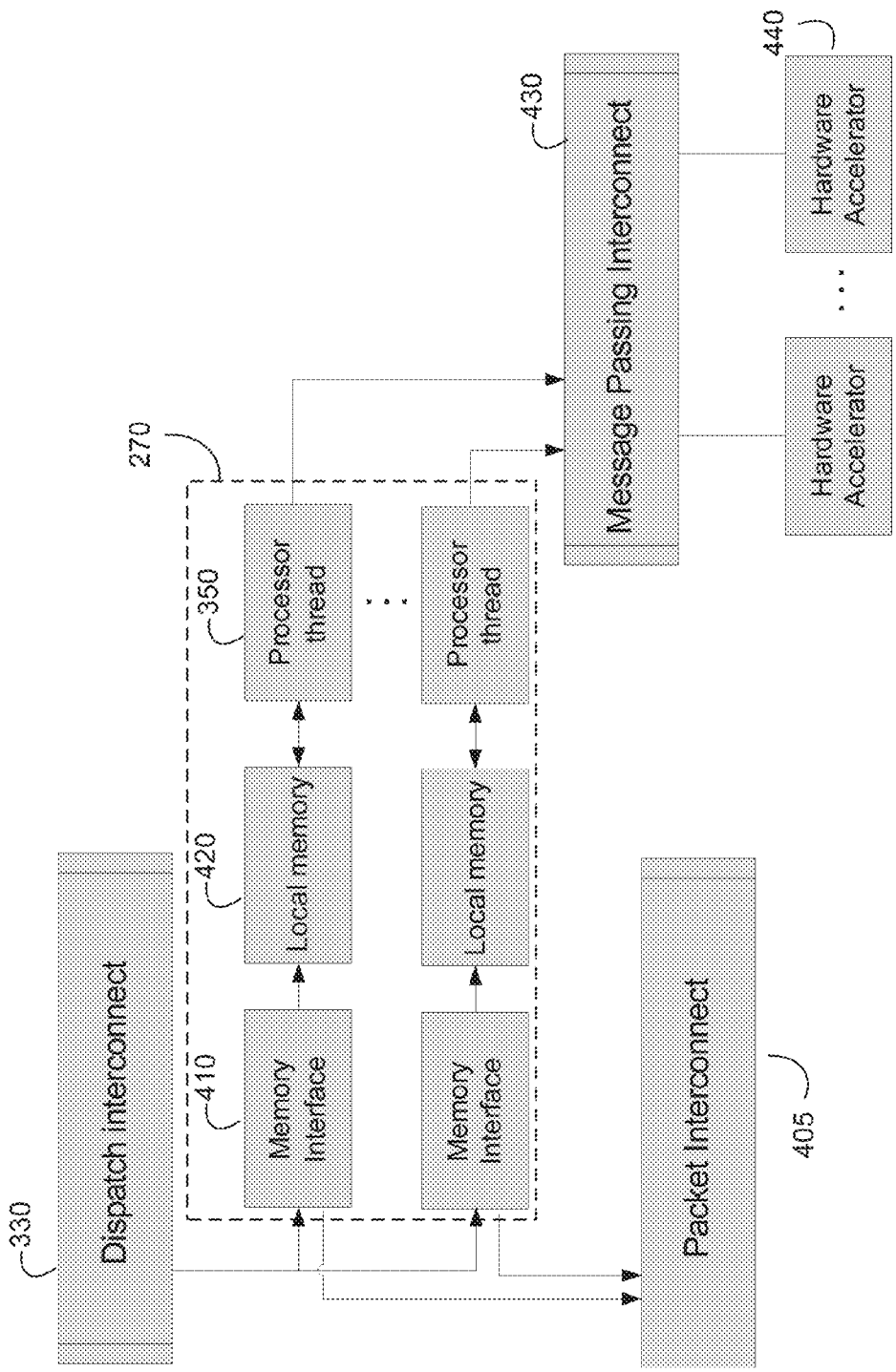
FIG. 4 is a diagrammatic view of memory interfaces of a packet classification function in accordance with an embodiment of the present invention.

FIG. 4 is a diagrammatic view of memory interfaces of a packet classification function 200 in accordance with an embodiment of the present invention. As illustrated in FIG. 4, dispatch interconnect 330 distributes packet data to processors 270 (FIG. 2) through memory interfaces 410 and local memories 420. Processors 270 transmit then transmit this packet data to hardware accelerators 440 using message passing interconnect 430 in order for the hardware accelerators 440 to perform any routines or subroutines associated with packet processing tasks. In addition, processors 270 may access external memory, such as the memory of packet buffer 340, using packet interconnect 405. In certain embodiments, one or more of dispatch interconnect 330, packet interconnect 405, and message passing interconnect 430 may be implemented by data bus 160 (FIG. 1).

Processors 270 include memory interfaces 410, local memories 420, and processor threads 350. Although processors 270 are illustrated with a single memory interface and local memory for each processor thread, there may be a single memory interface and local memory shared among many processing threads running on a single processor. Memory interfaces 410 receive header data from dispatch interconnect 330, and store and retrieve it in one or more of local memories 420 or external memories (not shown). In certain embodiments, memory interface 410 may use a parallel direct memory access (DMA) engine to store and retrieve header data only from local memories 420. In such embodiments, header data from a packet is stored in the local memory of a particular processor where it is being processed, is managed entirely by the code of that particular processor, and is not indexed in or kept coherent with any other memory of processors 270. In other words, no virtual memory or page table operations are used to store and retrieve the header data during processing. This improves efficiency of packet processing tasks, as no cache management is required for data access. In certain embodiments, header data may contain a pointer to the location where accompanying header data is stored, such as an external memory like buffer block 240. In such embodiments, memory interfaces 410 may use the pointer to request the payload data from the store via packet interconnect 405. In other embodiments, header data may be stored locally to a particular processor.

In certain embodiments, processors 270 may receive data from scheduling block 230 in a broadcast stream. DMA engines of each of the memory interfaces 410 associated with each processor listen, when idle, for header data that is addressed to a processing thread of that processor. The address may be a control word sent on dispatch interconnect 330 prior to the header data, or another signal routed to memory interfaces 410. This communication scheme provides near perfect utilization (i.e., near zero control overhead) for dispatch interconnect 330. This process is further described below with respect to FIG. 5.

Message passing interconnect 430 may transmit data from processor threads 350 of processors 270 to one or more hardware accelerators 440. Hardware accelerators 440 may be groups of programmable logic elements within FPGA fabric 250 that perform routines or subroutines associated with packet processing tasks. Once hardware accelerators 440 process header data according to a particular routine or subroutine, it may transmit that header data back to its associated processing thread of processor threads 350 using message passing interconnect 430. Once processor thread 350 is finished processing header data according to a particular packet processing task, they may store the processed header data in local memory 420 and transmit a signal to scheduling block 230 that indicates that the header data has been processed. Scheduling block 230 may then indicate to egress block 220 that the packet associated with the processed header data is ready for reassembly with its associated payload data. The reassembled packet may then be reordered with other packets in the same TCP flow and transmitted to their ultimate routing destination.

The use of FPGA fabric 250 for acceleration of packet processing tasks may be beneficial because it allows for portions of a packet processing algorithm to be offloaded to hardware in an FPGA, while using easy-to-program software code for the bulk of the instructions. In addition, the use of software code may be advantageous when the tasks are too algorithmically complex for a hardware implementation.

In certain embodiments, processors 270 may be divided into different classes. Each different class of processors may perform a different processing task. For example, a first set of processors may pre-process packets to identify flow-ID, while a second set of processors may distribute packets to different processing based on flow-id to aid in maintaining order. This division of processors into classes is discussed with respect to FIG. 7A of U.S. patent application Ser. No. 13/804,419, titled "Hybrid Programmable Many-Core Device with On-Chip Interconnect", filed concurrently herewith, which is incorporated by reference herein in its entirety.

In certain embodiments, different classes of processors 270 and programmable logic elements of FPGA fabric 250 may be used to manage power usage of the device that implements packet processing function 200 (e.g., device 100 (FIG. 1A)). For example, processors and programmable logic elements associated with partitions of device 100 may be powered up and down dynamically based on the demand for the processing capabilities of the processors and logic elements associated with each partition. This process is described with respect to FIG. 7B of U.S. patent application Ser. No. 13/804,419, titled "Hybrid Programmable Many-Core Device with On-Chip Interconnect", filed concurrently herewith, which is incorporated by reference herein in its entirety.

Although processors 270 have been discussed as functioning in a distributed model, in certain embodiments groups of processors may perform pipelined functions. In such embodiments, different groups of processors may have a different code base and accelerator connections via message passing interconnect 430. In addition, message passing interconnect 430 would provide communication paths between processors. These paths allow groups of processors to pass packets between groups.

Figure 5:
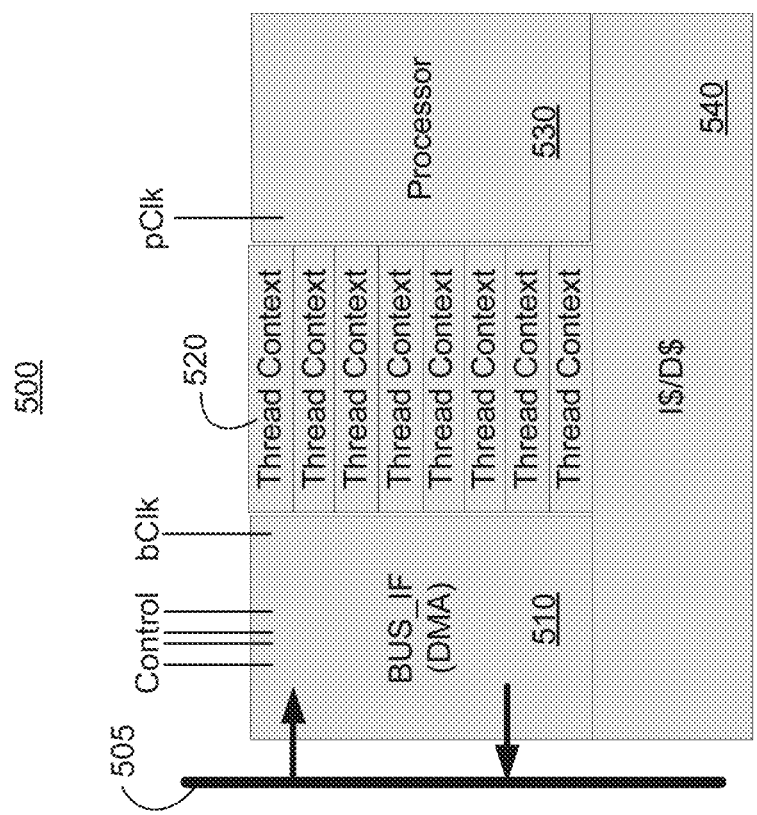
FIG. 5 is scheduling circuitry in accordance with an embodiment of the present invention.

FIG. 5 is scheduling circuitry 500 in accordance with an embodiment of the present invention. Scheduling circuitry 500 includes a data bus in the form of horizontal and vertical connectors 505, which can be substantially similar to horizontal and vertical connectors 167 (FIG. 1C), hardened data bus 160 (FIG. 1A), or data bus 260 (FIG. 2). Scheduling circuitry 500 can schedule the transmission of data on the horizontal and vertical connectors, or hardened data bus, between scheduling block 230 and processors 270 (FIG. 2). Processor 530 may be one of processors 270. In certain embodiments, processor 530 may be part of a column of tiled processors, such as those described with respect to processors 150 (FIG. 1A). In such embodiments, copies of scheduling circuitry 500 may be integrated with every processor in processors 150.

In certain embodiments, the rate of transmission of data between scheduling block 230 and processors 270 may be different, or asynchronous from, the rate of speed of the clock of processor 530. For example, the speed of the operation of the processor may be faster or slower than the speed of operation of the ingress block 210. Thus, the rate of speed at which data is transmitted between scheduling block 230 and processor 530 using horizontal and vertical connectors 505 may be different than the speed of the clock of processor 530.

In such embodiments, bus interface 510 may provide mechanisms that allow data to be transmitted on the horizontal and vertical connectors 505 at a rate asynchronous with respect to the speed of the clock of processor 530. In certain embodiments, bus interface 510 may receive addressing data over horizontal and vertical connectors 505. In such embodiments, this addressing data may contain information that indicates that the header data associated with the messages is meant to be processed by a processing thread within a particular processor or processors. Bus interface circuitry 510 may transmit only the header data addressed to a processing thread within processor 530, and ignore other data that is not addressed to a processing thread within processor 530. For example, bus interface circuitry 510 may contain predetermined or hardcoded values, either in software or hardware associated with bus circuitry 510, that are the addresses of processing threads within processor 530. Bus interface circuitry 510 may periodically or constantly monitor the data transmitted over horizontal and vertical connectors 505 for the address. When the address is detected, bus interface circuitry 510 may buffer header data associated with the address to processor 530, and transmit the data from the buffer to processor 530 using threading circuitry 520. Threading circuitry 520 maintains one or more program counters associated with the execution of various tasks in processor 530. In certain embodiments, threading circuitry 520 receives data from bus interface circuitry 510, and determines the appropriate time to send that data to processor 530 based on one or more of the program counters that it maintains. In this manner, scheduling circuitry 500 may allow the processors, programmable logic elements, and the data bus of a device to operate at different clock speeds, thus breaking any timing or clock dependency between the components tied to the network bus and the processor clock speed.

In certain embodiments, any suitable methods of asynchronous communication may be used to send data between the programmable logic elements of the device and processor 530. In certain embodiments, the functionality of scheduling circuitry 500 may be achieved by groups of two or more processors rather than scheduling circuitry 500. These groups of processors may identify which of the processors to send data received from the horizontal and vertical conductors of the device (i.e., transmitted from the programmable logic elements), and distribute the data to the identified processors. This identification may be determined similar to the monitoring procedure described above with respect to bus interface circuitry 510.

In certain embodiments, scheduling circuitry 500 may include a program instruction memory (not shown), which can include any suitable combination of external memory. In certain embodiments, the instruction set of the processors on the device, such as processor 530, may be modified during operation such that they are reconfigured with a new instruction set. This new instruction set may allow the device to achieve new or different functionality, such as inspect data according to new or updated rules according to a regex.

In such embodiments, the program instruction memory may detect a new mode of operation for one or more of the processors. For example, the program instruction memory may contain instructions for monitoring data packets on the horizontal and vertical connectors 505. Certain data packets, which can be identified by their packet header, may contain a control packet that contains instructions for reconfiguring processor 530 with new or updated functionality. Bus interface circuitry 510 may detect these control packets by monitoring horizontal and vertical connectors periodically or continuously to match the control packet headers. In response to the detection of a new mode of operation, the operation of processor 530 may be halted. For example, once bus interface circuitry 510 detects a control packet header, it may buffer the payload data of that packet and transfer the payload data to threading circuitry 520. Threading circuitry 520 may then perform one or more of the creation, execution, or insertion instructions in the threads or pipeline of processor 530 that cause processor 530 to halt operation, and flush out all pending instructions. Threading circuitry 520 may then transfer the payload of the control packet that contains the instructions for reconfiguring processor 530 from a buffer in bus interface circuitry 510 to processor 530. In certain embodiments, information in the header of the control packet may target a group of processors, such as a group of processors in one or more columns on the device. In such embodiments, the process described above may occur substantially in parallel for each of the targeted processors on the device using each processor's associated bus interface circuitry.

In certain embodiments, received packets may be processed to increase network security. For example, the first portion of a TCP flow containing a URL for an HTTP protocol may need to be blocked to prevent spam or viruses. To achieve this increased security, deep packet inspection may be used. Deep packet inspection operations examine the payload of a packet itself. Deep packet inspection operations may include regular expression based on rules stored in TCAM memory 137 (FIG. 1A), coded into a local memory, or as a regex compiled in hardware of device 100 itself (e.g., programmable logic elements 130. In other embodiments, scheduling block 230 (FIG. 2) may reconfigure the device based on programming files received at the input of the device (e.g., ingress block 210 (FIG. 2)). Once the programming files are received, one or more groups of processors 270 associated with regex processing may be shut down, reconfigured, and restarted.

Figure 6:
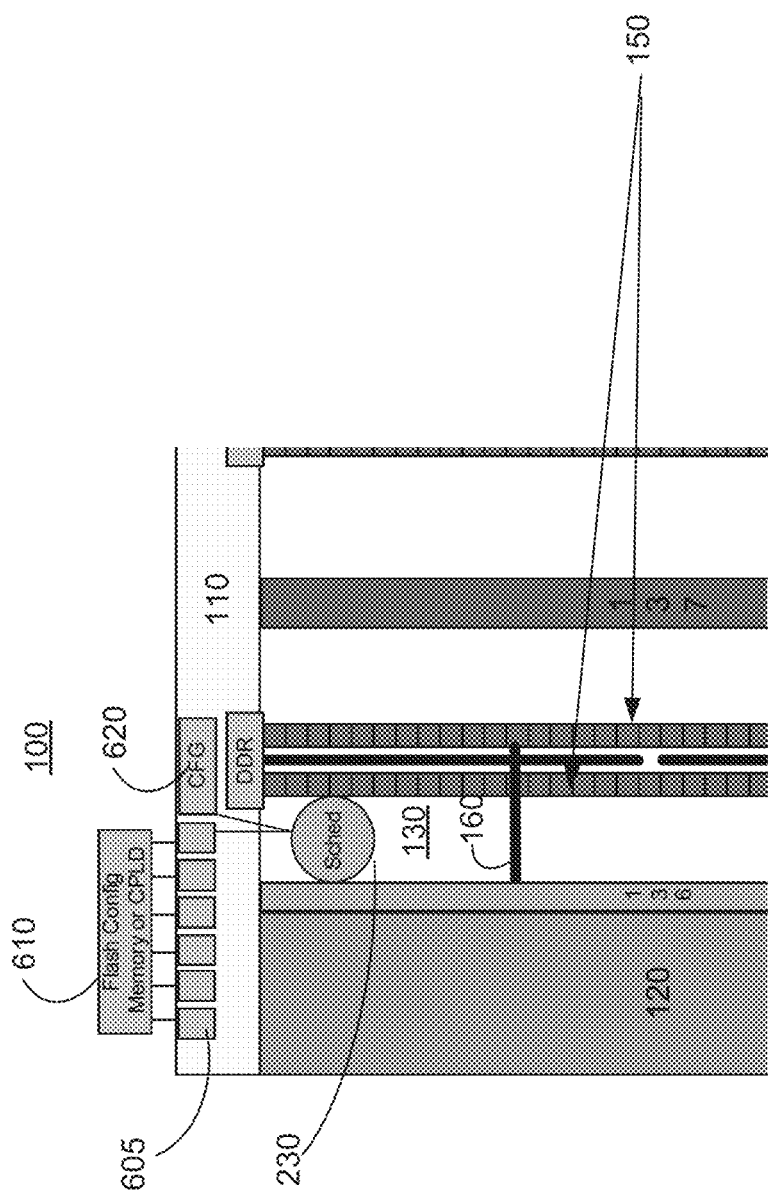
FIG. 6 is circuitry for reconfiguring a hybrid programmable logic device in accordance with an embodiment of the present invention.

FIG. 6 is circuitry for reconfiguring hybrid programmable logic device 100 (FIG. 1) in accordance with an embodiment of the present invention. FIG. 6 is an enhanced cut-out view of FIG. 1. External flash memory controller 610 may be filled with programming files using any suitable external device or software such as, for example, the MAX® II device provided by Altera Corporation, of San Jose, Calif. External flash memory controller 310 may transmit these files using any suitable transmission protocol to pins 605. Once scheduling block 230 detects that the programming files have been received, it transmits them to the processors 150 (or processors 270) that will be reconfigured with the new or updated regex. In certain embodiments, control region block 620 may assist in the reconfiguration of processors by sending control signals to the processor targeted for reconfiguration.

Figure 7:
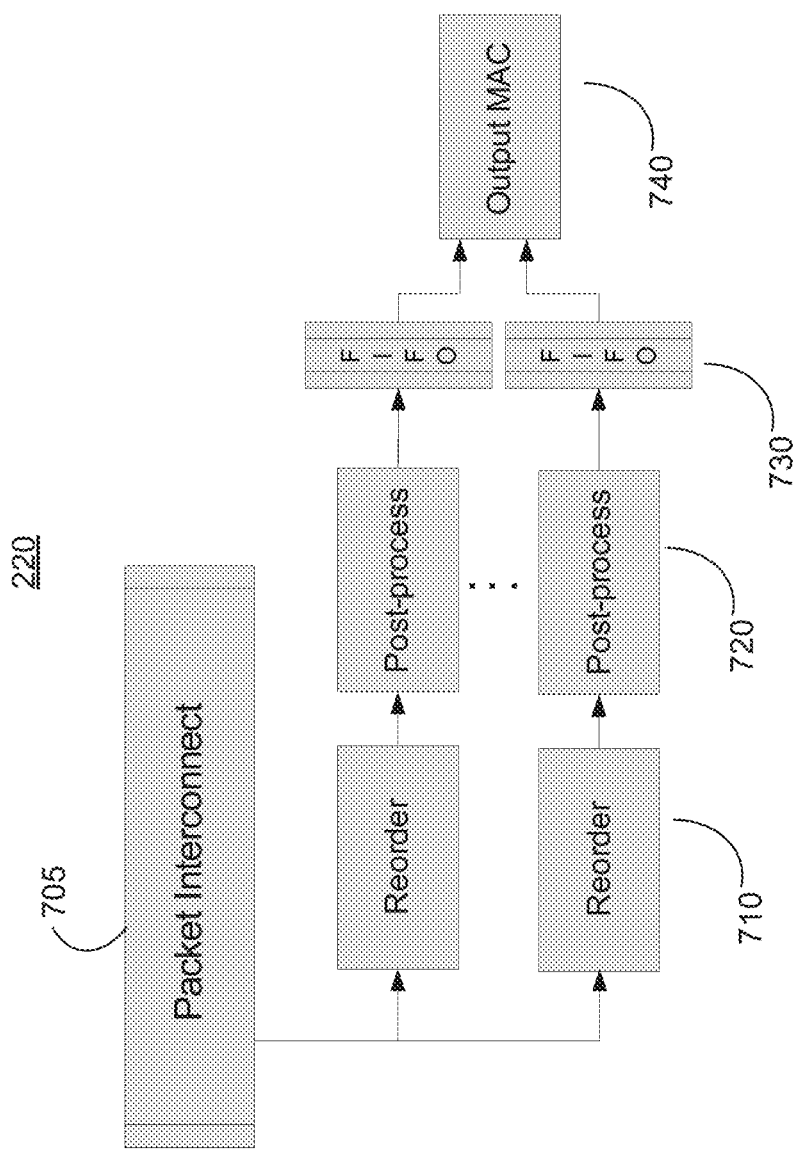
FIG. 7 is a more detailed view of an egress block of a packet classification function in accordance with an embodiment of the present invention.

FIG. 7 is a more detailed view of an egress block 220 of a packet classification function 200 (FIG. 2) in accordance with an embodiment of the present invention. Egress block 220 may receive data from packet interconnect 705, which is substantially similar to packet interconnect 405 (FIG. 4), and transmit it to reorder blocks 710. Reorder blocks 710 reassemble header data with corresponding payload data to form a processed packet. In certain embodiments, reorder blocks 710 may receive control signals from processors 270 (FIG. 2) that indicate that particular header data has been processed. Reorder blocks 710 may then request payload data corresponding to the particular header data from packet buffer 340 (FIG. 3). Once header data is matched to corresponding payload data, the complete packets are reordered to follow the same TCP flow as the packets arrived at ingress block 210. The reordered packets are then sent to post-process block 720. At post-process block 720, the reordered packets may be encrypted, processed using error control algorithms, or any other suitable post-processing algorithm. The packets are then multiplexed by FIFO 730 to output MAC 740, and routed to their ultimate destination.

In certain embodiments, processors 150 (FIG. 1A) or 270 (FIG. 2) may communicate with traffic management circuitry, such as queuing network or queue manager, in order to feed data to ingress block 210. Such traffic management circuitry may include Altera Traffic Management reference designs, implemented in Stratix® series FPGAs and sold by Altera Corporation, of San Jose, Calif.

Figure 8:
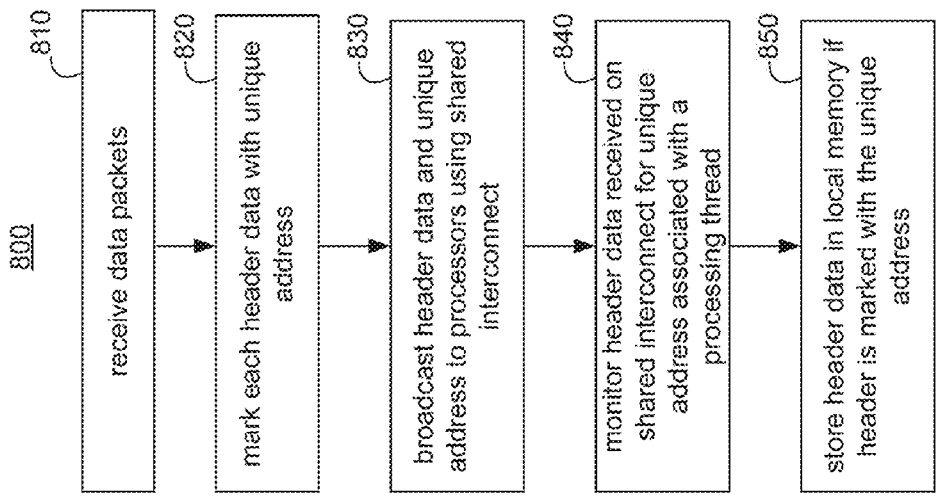
FIG. 8 is an illustrative process for routing data packets to processors in a hybrid programmable logic device in accordance with an embodiment of the present invention.

FIG. 8 is an illustrative process 800 for routing data packets to processors in a hybrid programmable logic device (such as device 100 (FIG. 1A)) in accordance with an embodiment of the present invention. Process 800 begins at step 810. At step 810, data packets are received. These packets may contain control data, header data and payload data in any suitable packet frame format. In certain embodiments, data packets may be received at transceivers of the device, such as those described with respect to high-speed transceivers 212 (FIG. 2). Process 800 proceeds to step 820.

At step 820, the header data of each packet is marked with a unique address. The unique address may identify a particular processor among processors 270 (FIG. 2) or a processing thread running on a particular processor among processors 270. This address may then be used by processors 270 to determine whether they should process particular header data that they receive, what particular processing thread to use, or whether they should ignore particular header data. In certain embodiments, the unique address may be assigned based on which processing threads are available to process data. For example, the unique address may identify the first processing thread in a list of processing threads that are not currently processing data. In certain embodiments, this list of processing threads may be maintained by device 100. Process 800 proceeds to step 830.

At step 830, the header data and associated unique address may be transmitted to processors 270 over a shared interconnect. This shared interconnect may be broadcast data to each of processors 270 on the same data bus. In certain embodiments, the shared interconnect may be implemented in horizontal and vertical connectors 505 as discussed with respect to FIG. 5. Accordingly, each of processors 270 may receive the header data transmitted over the shared interconnect. Process 800 proceeds to step 840. At step 840, each processor may monitor the header data received on the shared interconnect to determine if it is marked with the unique address of the processor or a particular processor thread running on the processor. If particular header data is marked with a unique address that matches the address of a processor or a particular processor thread running on the processor, process 800 proceeds to step 850. Otherwise, the processor may ignore (i.e., not store) the particular header data and step 840 may be repeated by the processor until a match is detected. At step 850, the header data is stored in the local memory of the particular processor if a header data is marked with a unique address that matches the address of that processor or a particular processor thread running on that processor. The header data may then be processed by programmable logic elements associated with the particular processor according to one or more packet processing tasks. In certain embodiments, these programmable logic elements may include hardware acceleration blocks as discussed with respect to FPGS fabric 250 (FIG. 2). In addition, these packet processing tasks may be similar to those described with respect to processors 270. Process 800 then ends.

It will be understood that the foregoing is only illustrative of the principles of the invention, and that various modifications can be made by those skilled in the art without departing from the scope and spirit of the invention. One skilled in the art will appreciate that the present invention can be practiced by other than the described embodiments, which are presented for purposes of illustration and not of limitation, and the present invention is limited only by the claims that follow.

What is claimed is:

1. A hybrid programmable logic device, comprising:
    transceivers that receive data packets, wherein the data packets comprise header data and payload data;
    programmable logic fabric comprising programmable logic elements, wherein a first portion of the programmable logic elements provide hardware acceleration functions;
    processors interleaved with the programmable logic elements, wherein each of the processors process the received header data using the hardware acceleration functions and processing threads, and a second portion of the programmable logic elements schedule the distribution of header data to the processing threads, wherein each processing thread of the processors is associated with a unique address received by each of the processors via an interconnect shared by each of the processors, wherein each of the processors comprises a memory interface that monitors the received header data for the unique address associated with each respective processing thread and stores the received header data in a local memory when the received header data is marked with the unique address.

2. The device of claim 1, further comprising local memory that stores the payload data, and wherein the second portion of programmable logic is further configured to:
    frame the received data packets into header data and payload data;
    buffer the payload data into the local memory;
    determine which processing threads are available; and
    route the payload data to an available processing thread based on the determination.

3. The device of claim 1, wherein the second portion of programmable logic is further configured to:
    determine if there are no available processing threads; and
    in response to the determination, drop one or more of the received data packets.

4. The device of claim 1, wherein the hardware acceleration functions include one or more of maintenance of routing tables, encryption of payload data, compression of payload data, and IP table lookup.

5. The device of claim 1, wherein a third portion of the programmable logic elements:
    reassemble processed header data with associated payload data to form reassemble packets; and
    maintain order of the reassemble packets based on the TCP flow-ID of the received packet.

6. The device of claim 1, wherein
    the memory interface:
    receives header data from the second portion of programmable logic elements; and
    stores the received header data in the local memory using direct memory access, wherein the processor accesses the stored header data directly from the local memory to perform at least one packet processing task.

7. The device of claim 1, wherein the memory interface does not store the received header data in the local memory when the received header data is not marked with the unique address.

8. The device of claim 1, wherein the second portion of programmable logic elements assigns each header data the unique address associated with an available processing thread.

9. The device of claim 1, further comprising horizontal and vertical connectors consisting of fixed logic elements.

10. The device of claim 9, wherein the horizontal and vertical connectors transmit data between the second portion of the programmable logic elements and the processors.

11. The device of claim 1, wherein the processors are physically sized such that at least one of the length, width, or height of each of the processors is equal to a multiple of a same physical dimension of the programmable logic elements.

12. The device of claim 1, wherein each of the processors consist of fixed logic elements.

13. The device of claim 1, wherein the second portion of programmable logic elements distribute header data associated with a same TCP flow to a group of the processors.

14. The device of claim 1, wherein the interconnect shared by each of the processors transmits header data between the second portion of the programmable logic elements and the processors, and wherein the processors receive the header data over the interconnect in a broadcast stream.

15. The device of claim 1, wherein the programmable logic fabric comprises a field programmable gate array fabric.

16. A method for routing data packets to processors in a hybrid programmable logic device, wherein each of the processors comprise local memory and run processing threads, the method comprising:
  receiving data packets comprising header data and payload data at transceivers;
  marking each header data with a unique address associated with an available processing thread in one of the processors;
  broadcasting the header data and unique address to the processors on an interconnect shared by each of the processors; and
  at each processor:
    monitoring the header data received on the shared interconnect for a unique address associated with a processing thread running on the processor; and
    storing the header data in the local memory of the processor if the header is marked with the unique address associated with a processing thread running on the processor.

17. The method of claim 16, wherein the hybrid programmable logic device comprises programmable logic elements and the processors are interleaved with the programmable logic elements, further comprising:
  at each processor, transmitting stored header data to a group of the programmable logic elements that perform at least one packet processing function.

18. The method of claim 17, wherein the processors and the programmable logic elements access the stored header data directly from the local memory.

* * * * *